US011157055B2

(12) United States Patent
Wells

(10) Patent No.: US 11,157,055 B2
(45) Date of Patent: Oct. 26, 2021

(54) APPARATUS, METHODS, AND SYSTEMS FOR TRACKING VEHICLE BATTERY USAGE WITH A BLOCKCHAIN

(71) Applicant: TOYOTA MOTOR NORTH AMERICA, INC., Plano, TX (US)

(72) Inventor: Andrew L. Wells, Denton, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 151 days.

(21) Appl. No.: 16/152,996

(22) Filed: Oct. 5, 2018

(65) Prior Publication Data

US 2020/0110453 A1    Apr. 9, 2020

(51) Int. Cl.
  *G06F 1/28* (2006.01)
  *G06F 16/951* (2019.01)
  *B60L 53/60* (2019.01)
  *B60L 58/10* (2019.01)
  *H04L 9/06* (2006.01)

(52) U.S. Cl.
  CPC ........... *G06F 1/28* (2013.01); *B60L 53/60* (2019.02); *B60L 58/10* (2019.02); *G06F 16/951* (2019.01); *H04L 9/0637* (2013.01)

(58) Field of Classification Search
  CPC .......... G06F 1/28; G06F 16/951; B60L 53/60; B60L 58/10; H04L 9/0637
  See application file for complete search history.

(56) References Cited

U.S. PATENT DOCUMENTS

| 9,176,195 | B2 * | 11/2015 | Maeda | B60L 58/13 |
| 9,984,522 | B2 | 5/2018 | Ricci | |
| 2008/0224667 | A1 * | 9/2008 | Tanaka | H01M 10/44 |
| | | | | 320/139 |
| 2010/0330950 | A1 * | 12/2010 | Wells | H04W 52/0264 |
| | | | | 455/404.1 |
| 2011/0077879 | A1 * | 3/2011 | Paryani | G01R 31/392 |
| | | | | 702/63 |

(Continued)

FOREIGN PATENT DOCUMENTS

| CN | 102722968 A | 10/2012 |
| CN | 106740243 A | 5/2017 |

(Continued)

*Primary Examiner* — Aurel Prifti
(74) *Attorney, Agent, or Firm* — Haynes and Boone, LLP

(57) ABSTRACT

Apparatus, systems, and methods for tracking vehicle battery usage with a blockchain. One such method includes detecting, using one or more sensors, one or more operating parameters of a vehicle, at least one of the one or more operating parameters being associated with a battery of the vehicle. A battery-critical event is identified based on the detected one or more operating parameters of the vehicle. Information associated with the detected one or more operating parameters of the vehicle is communicated via a network and to a central server; information associated with the detected one or more operating parameters of the vehicle and the identified battery-critical event is aggregated in a blockchain using the central server. The information associated with the detected one or more operating parameters of the vehicle and the identified battery-critical event is queried from the blockchain to ascertain a usage history of the battery.

24 Claims, 5 Drawing Sheets

(56) References Cited

U.S. PATENT DOCUMENTS

| | | | |
|---|---|---|---|
| 2011/0082621 A1* | 4/2011 | Berkobin | B60L 53/30 701/31.4 |
| 2011/0218703 A1* | 9/2011 | Uchida | B60L 58/12 701/31.4 |
| 2011/0221392 A1* | 9/2011 | Gale | B60L 58/16 320/109 |
| 2012/0101755 A1* | 4/2012 | Hirasawa | G06Q 30/0645 702/63 |
| 2013/0110296 A1* | 5/2013 | Khoo | B60L 53/60 700/286 |
| 2013/0278221 A1* | 10/2013 | Maeda | B60L 58/15 320/134 |
| 2014/0107956 A1* | 4/2014 | Miyaki | B60L 58/12 702/63 |
| 2014/0133374 A1* | 5/2014 | Frye | H04W 52/0251 370/311 |
| 2014/0203738 A1* | 7/2014 | Yamazaki | H01M 10/0525 318/139 |
| 2014/0347018 A1* | 11/2014 | Boblett | B60L 53/30 320/162 |
| 2015/0105947 A1* | 4/2015 | Chang | H02J 7/00 701/22 |
| 2015/0120226 A1* | 4/2015 | Tanabe | G01R 31/3648 702/63 |
| 2015/0323610 A1* | 11/2015 | Ahn | H02J 7/0021 320/152 |
| 2015/0360578 A1* | 12/2015 | Duan | B60L 58/12 340/455 |
| 2016/0072320 A1* | 3/2016 | Kanda | B60L 58/10 320/134 |
| 2016/0075247 A1* | 3/2016 | Uyeki | H02J 7/0027 455/456.3 |
| 2016/0299197 A1* | 10/2016 | Kim | G01R 31/367 |
| 2016/0311330 A1* | 10/2016 | Liu | B60L 58/16 |
| 2017/0088001 A1* | 3/2017 | Haas | B60L 11/1844 |
| 2017/0358168 A1* | 12/2017 | Fan | G06Q 30/0234 |
| 2018/0018723 A1* | 1/2018 | Nagla | G06Q 30/0609 |
| 2018/0170207 A1* | 6/2018 | Ko | H02J 7/008 |
| 2018/0204393 A1* | 7/2018 | Landolsi | F02M 35/021 |
| 2018/0257473 A1* | 9/2018 | Follen | B60L 53/64 |
| 2018/0308300 A1* | 10/2018 | Kurimoto | G06F 16/955 |
| 2018/0345800 A1* | 12/2018 | Beer | B60L 11/184 |
| 2019/0033381 A1* | 1/2019 | Karner | G01R 31/374 |
| 2019/0042726 A1* | 2/2019 | Unagami | H04L 63/08 |
| 2019/0073701 A1* | 3/2019 | Sonnad | G06Q 20/02 |
| 2019/0118655 A1* | 4/2019 | Grimes | B60L 53/68 |
| 2019/0176639 A1* | 6/2019 | Kumar | B60L 3/0046 |
| 2019/0217716 A1* | 7/2019 | Yang | B60L 53/60 |
| 2019/0275894 A1* | 9/2019 | Amacker | H04L 9/0637 |
| 2019/0287140 A1* | 9/2019 | Arora | G06Q 30/0278 |
| 2019/0329668 A1* | 10/2019 | Li | G01R 31/382 |
| 2019/0378365 A1* | 12/2019 | Jordan, III | B60L 53/60 |
| 2020/0027183 A1* | 1/2020 | Guttridge | H04L 9/0861 |
| 2020/0034888 A1* | 1/2020 | Soundararajan | G06Q 30/0272 |
| 2020/0073651 A1* | 3/2020 | Rodriguez Bravo | H04W 4/40 |
| 2020/0153264 A1* | 5/2020 | Osada | B60L 50/64 |
| 2020/0164763 A1* | 5/2020 | Holme | B60L 58/10 |
| 2020/0198495 A1* | 6/2020 | Rizzoni | B60L 50/51 |
| 2020/0202334 A1* | 6/2020 | Graf | H04L 9/0637 |
| 2020/0295586 A1* | 9/2020 | Jeong | G01R 19/165 |
| 2021/0081404 A1* | 3/2021 | Kempf | H04L 9/321 |

FOREIGN PATENT DOCUMENTS

| | | |
|---|---|---|
| CN | 107786639 A | 3/2018 |
| CN | 108154243 A | 6/2018 |
| KR | 1020120133620 A4 | 12/2012 |

* cited by examiner

APPARATUS, METHODS, AND SYSTEMS FOR TRACKING VEHICLE BATTERY USAGE WITH A BLOCKCHAIN

TECHNICAL FIELD

The present disclosure relates generally to tracking battery usage and, more particularly, to apparatus, systems, and methods for tracking vehicle battery usage with a blockchain.

BACKGROUND

Logging the age of a vehicle's battery together with the number of charge cycles the battery has been through provides only a limited understanding of the battery's usage history. However, with the increasing availability of electric vehicles in the marketplace, a finer understanding of a battery's usage history is needed. Moreover, once the original vehicle in which the battery was installed has worn out or been otherwise decommissioned, the vehicle battery may be recycled to power another vehicle, making it difficult to track the usage history of a particular battery over time. It would therefore be desirable to provide a more detailed (and immutable) accounting of vehicle battery usage to better assess a residual value of the battery. Therefore, what is needed is an apparatus, system, and/or method that addresses one or more of the foregoing issues, and/or one or more other issues.

SUMMARY

The present disclosure provides apparatus, systems, and methods for tracking vehicle battery usage with a blockchain. A generalized method for tracking vehicle battery usage with a blockchain includes detecting, using one or more sensors, one or more operating parameters of a vehicle, at least one of the one or more operating parameters being associated with a battery of the vehicle. A battery-critical event is identified based on the detected one or more operating parameters of the vehicle. Information associated with the detected one or more operating parameters of the vehicle is communicated via a network and to a central server; information associated with the detected one or more operating parameters of the vehicle and the identified battery-critical event is aggregated in a blockchain using the central server. The information associated with the detected one or more operating parameters of the vehicle and the identified battery-critical event is queried from the blockchain to ascertain a usage history of the battery.

A generalized system for tracking vehicle battery usage with a blockchain includes a vehicle having a battery adapted to power the vehicle. One or more sensors are adapted to detect one or more operating parameters of the vehicle, at least one of the one or more operating parameters being associated with the battery of the vehicle. Information associated with the detected one or more operating parameters of the vehicle is adapted to be communicated to a central server via a network. Information associated with the detected one or more operating parameters of the vehicle and a battery-critical event is adapted to be aggregated in a blockchain using the central server, and the information associated with the detected one or more operating parameters of the vehicle and the identified battery-critical event is adapted to be queried from the blockchain to ascertain a usage history of the battery. The battery-critical event is identified based on the detected one or more operating parameters of the vehicle.

A generalized apparatus for tracking vehicle battery usage with a blockchain includes a non-transitory computer readable medium and a plurality of instructions stored on the non-transitory computer readable medium and executable by one or more processors. The plurality of instructions include instructions that, when executed, cause the one or more processors to detect, using one or more sensors, one or more operating parameters of a vehicle, at least one of the one or more operating parameters being associated with a battery of the vehicle. The plurality of instructions also include instructions that, when executed, cause the one or more processors to identify, based on the detected one or more operating parameters of the vehicle, a battery-critical event. The plurality of instructions also include instructions that, when executed, cause the one or more processors to communicate, via a network and to a central server, information associated with the detected one or more operating parameters of the vehicle. The plurality of instructions also include instructions that, when executed, cause the one or more processors to aggregate, using the central server and in a blockchain, information associated with the detected one or more operating parameters of the vehicle and the identified battery-critical event. Finally, the plurality of instructions also include instructions that, when executed, cause the one or more processors to query, from the blockchain, the information associated with the detected one or more operating parameters of the vehicle and the identified battery-critical event to ascertain a usage history of the battery.

DETAILED DESCRIPTION

The present disclosure leverages the trusted characteristics of a blockchain to provide a detailed accounting of how a vehicle's battery has been used in order to better assess a residual value of the battery. In some embodiments, this includes, but is not limited to, logging the number of charge cycles and battery age. More particularly, the present system uses a blockchain to track aspects specific to electric vehicles. For example, the present system may track cycles of an electric vehicle's battery including charges/discharges and/or other conditions associated with the battery such as, for example, overcharges, general characteristics, location, environmental conditions over the battery's lifespan, accident history, and the like. In some embodiments, the battery may include a unique identifier (e.g., an RFID tag) that is used to link information logged within the blockchain to the battery and to a vehicle within which the battery is installed. The blockchain can include a distributed application and a trusted interface within the vehicle that automatically logs the relevant information as the battery is used. In various embodiments, the system can score the usage to provide a quick reference about the current condition of the battery along with providing the complete usage history. In further aspects, the system can specifically identify any critical combination of events that may lead to degradation of battery life (e.g., exposure to extreme heat when overcharged, wet conditions when charging battery, etc.). The system can then assess this information to learn characteristics of battery life, know when to change the battery, and assess battery value when the vehicle or battery is sold.

Figure 1:
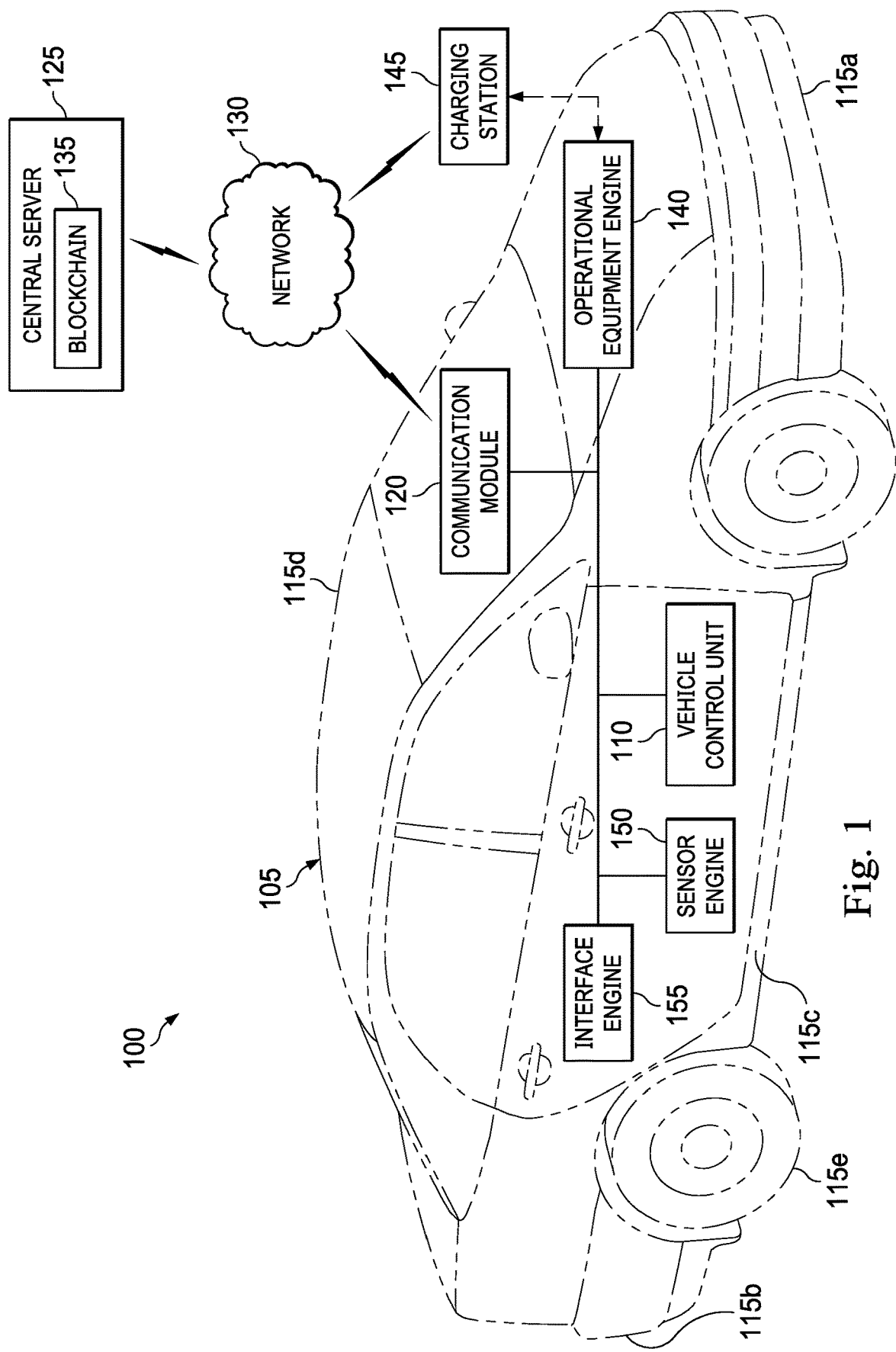
FIG. 1 is a diagrammatic illustration of a battery usage tracking system operable to track a vehicle's battery usage, according to one or more embodiments of the present disclosure.

Referring to FIG. 1, in an embodiment, a battery usage tracking system is generally referred to by the reference numeral 100 and includes a vehicle 105, such as an automobile, and a vehicle control unit 110 located on the vehicle 105. The vehicle 105 may include a front portion 115a (including a front bumper), a rear portion 115b (including a rear bumper), a right side portion 115c (including a right front quarter panel, a right front door, a right rear door, and a right rear quarter panel), a left side portion 115d (including a left front quarter panel, a left front door, a left rear door, and a left rear quarter panel), and wheels 115e. A communication module 120 is operably coupled to, and adapted to be in communication with, the vehicle control unit 110. The communication module 120 is adapted to communicate wirelessly with a central server 125 via a network 130 (e.g., a 3G network, a 4G network, a 5G network, a Wi-Fi network, or the like). The central server 125 includes a blockchain 135 adapted to track and account for, among other things, the vehicle 105's battery usage, as will be described in further detail below.

An operational equipment engine 140 is operably coupled to, and adapted to be in communication with, the vehicle control unit 110. The operational equipment engine 140 is connectable to a charging station 145, as will be described in further detail below. A sensor engine 150 is operably coupled to, and adapted to be in communication with, the vehicle control unit 110. The sensor engine 150 is adapted to monitor various components of, for example, the operational equipment engine 140, as will be described in further detail below. An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, the sensor engine 150, and/or the interface engine 155 may be operably coupled to, and adapted to be in communication with, another of the components via wired or wireless communication (e.g., via an in-vehicle network). In some embodiments, as in FIG. 1, the vehicle control unit 110 is adapted to communicate with the communication module 120, the operational equipment engine 140, the sensor engine 150, and the interface engine 155 to at least partially control the interaction of data with and between the various components of the battery usage tracking system 100.

The term "engine" is meant herein to refer to an agent, instrument, or combination of either, or both, agents and instruments that may be associated to serve a purpose or accomplish a task-agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with the vehicle control unit 110, the communication module 120, the network 130, the central server 125, the charging station 145, and/or the blockchain 135.

Figure 2:
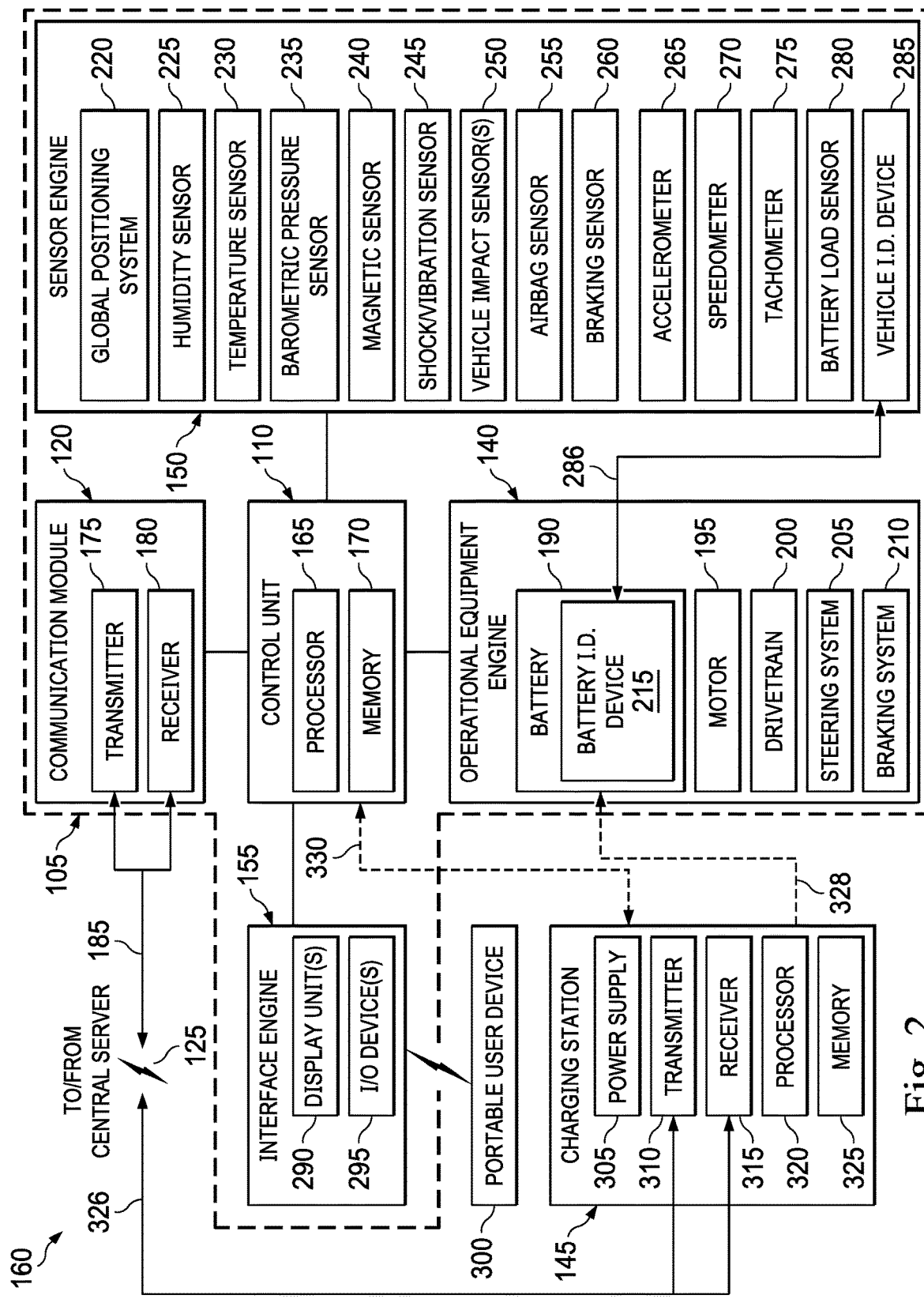
FIG. 2 is a diagrammatic illustration of an apparatus including several components of the system of FIG. 1, according to one or more embodiments of the present disclosure.

Referring to FIG. 2, in an embodiment, an apparatus is generally referred to by the reference numeral 160 and includes several components of the battery usage tracking system 100, which components are given the same reference numerals. Although not shown in FIG. 2, the apparatus 160 also includes the vehicle 105, in which the other components of the apparatus 160 may be located either permanently or temporarily. The vehicle control unit 110 includes a processor 165 and a memory 170. In some embodiments, as in FIG. 2, the communication module 120, which is operably coupled to, and adapted to be in communication with, the vehicle control unit 110, includes a transmitter 175 and a receiver 180. In some embodiments, one or the other of the transmitter 175 and the receiver 180 may be omitted according to the particular application for which the communication module 120 is to be used. In some embodiments, the transmitter 175 and the receiver 180 are combined into a transceiver capable of both sending and receiving wireless signals. In any case, the transmitter 175 and the receiver 180 are adapted to send/receive data to/from the central server 125, as indicated by arrow 185.

In some embodiments, as in FIG. 2, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, a drivetrain 200, a steering system 205, and a braking system 210. The vehicle battery 190 provides electrical power to the motor 195 to drive the wheels 115e of the vehicle 105 via the drivetrain 200. In some embodiments, in addition to providing power to the motor 195 to drive the wheels 115e of the vehicle 105 via the drivetrain 200, the vehicle battery 190 provides electrical power to another component of the operational equipment engine 140, the vehicle control unit 110, the communication module 120, the sensor engine 150, the interface engine 155, or any combination thereof. In some embodiments, as in FIG. 2, the vehicle battery 190 includes a battery identification device 215. The battery identification device 215 is adapted to communicate with one or more components of the sensor engine 150, as will be described in further detail below. The battery identification device 215 stores data identifying the vehicle battery 190 such as, for example, manufacturing information (e.g., production date, production facility, etc.), battery characteristic(s) information, battery identification number information, electric vehicle compatibility information, or the like.

In some embodiments, as in FIG. 2, the sensor engine 150, which is operably coupled to, and adapted to be in communication with, the vehicle control unit 110, includes include devices such as sensors, meters, detectors, or other devices configured to measure or sense a parameter related to a driving operation of the vehicle 105, as will be described in further detail below. For example, the sensor engine 150 may include a global positioning system 220, a humidity sensor 225, a temperature sensor 230, a barometric pressure sensor 235, a magnetic sensor 240, a shock/vibration sensor 245, a vehicle impact sensor 250, an airbag sensor 255, a braking sensor 260, an accelerometer 265, a speedometer 270, a tachometer 275, a battery load sensor 280, a vehicle identification device 285, or any combination thereof. The sensors or other detection devices are generally configured to sense or detect activity, conditions, and circumstances in an area to which the device has access. Sub-components of the sensor engine 150 may be deployed at any operational area where information on the driving of the vehicle 105 may occur. Readings from the sensor engine 150 are fed back to the vehicle control unit 110. The reported data may include the sensed data, or may be derived, calculated, or inferred from sensed data. The vehicle control unit 110 may send signals to the sensor engine 150 to adjust the calibration or operating parameters of the sensor engine 150 in accordance with a control program in the vehicle control unit 110. The vehicle control unit 110 is adapted to receive and process data from the sensor engine 150 or from other suitable source(s), and to monitor, store (e.g., in the memory 170), and/or otherwise process (e.g., using the processor 165) the received data.

The global positioning system 220 is adapted to track the location of the vehicle 105 and to communicate the location information to the vehicle control unit 110. The humidity sensor 225 is adapted to detect environmental humidity levels and to communicate the humidity information to the vehicle control unit 110. The temperature sensor 230 is adapted to detect environmental temperature levels and to communicate the temperature information to the vehicle control unit 110. The barometric pressure sensor 235 is adapted to detect environmental barometric pressure levels and to communicate the barometric pressure information to the vehicle control unit 110. The magnetic sensor 240 is adapted to detect the presence and strength of magnetic fields and to communicate the magnetic field information to the vehicle control unit 110. The shock/vibration sensor 245 is adapted to detect shock and/or vibration and to communicate the shock and/or vibration information to the vehicle control unit 110. In some embodiments, the humidity sensor 225, the temperature sensor 230, the barometric pressure sensor 235, the magnetic sensor 240, the shock/vibration sensor 245, or any combination thereof are positioned at or near the vehicle battery 190 (e.g., in a battery compartment of the vehicle 105) to monitor humidity, temperature, barometric pressure, magnetic field, shock, and/or vibration in or around the vehicle battery 190. In addition to, or instead of, being positioned at or near the vehicle battery 190 to monitor conditions in or around the vehicle battery 190, the humidity sensor 225, the temperature sensor 230, the barometric pressure sensor 235, the magnetic sensor 240, and/or the shock/vibration sensor 245 may be located elsewhere on the vehicle 105 to monitor ambient conditions.

The vehicle impact sensor 250 is adapted to detect an impact of the vehicle with another vehicle or object, and to communicate the impact information to the vehicle control unit 110. In some embodiments, the vehicle impact sensor 250 is or includes a G-sensor. In some embodiments, the vehicle impact sensor 250 is or includes a microphone. In some embodiments, the vehicle impact sensor 250 includes multiple vehicle impact sensors, respective ones of which may be incorporated into the front portion 115a (e.g., the front bumper), the rear portion 115b (e.g., the rear bumper), the right side portion 115c (e.g., the right front quarter panel, the right front door, the right rear door, and/or the right rear quarter panel), and/or the left side portion 115d (e.g., the left front quarter panel, the left front door, the left rear door, and/or the left rear quarter panel) of the vehicle 105. The airbag sensor 255 is adapted to activate and/or detect deployment of the vehicle 105's airbag(s) and to communicate the airbag deployment information to the vehicle control unit 110. The braking sensor 260 is adapted to monitor usage of the vehicle 105's braking system 210 (e.g., an antilock braking system 210) and to communicate the braking information to the vehicle control unit 110.

The accelerometer 265 is adapted to monitor acceleration of the vehicle 105 and to communicate the acceleration information to the vehicle control unit 110. The accelerometer 265 may be, for example, a two-axis accelerometer 265 or a three-axis accelerometer 265. In some embodiments, the accelerometer 265 is associated with an airbag of the vehicle 105 to trigger deployment of the airbag. The speedometer 270 is adapted to monitor speed of the vehicle 105 and to communicate the speed information to the vehicle control unit 110. In some embodiments, the speedometer 270 is associated with a display unit of the vehicle 105 such as, for example, a display unit of the interface engine 155, to provide a visual indication of vehicle speed to a driver of the vehicle 105. The tachometer 275 is adapted to monitor the working speed (e.g., in revolutions-per-minute) of the vehicle 105's motor 195 and to communicate the angular velocity information to the vehicle control unit 110. In some embodiments, the tachometer 275 is associated with a display unit of the vehicle 105 such as, for example, a display unit of the interface engine 155, to provide a visual indication of the motor 195's working speed to the driver of the vehicle 105. The battery load sensor 280 is adapted to monitor charging, discharging, and/or overcharging of the vehicle battery 190 and to communicate the charging, discharging, and/or overcharging information to the vehicle control unit 110.

In some embodiments, as in FIG. 2, the vehicle identification device 285 stores data identifying the vehicle 105 such as, for example, manufacturing information (e.g., make, model, production date, production facility, etc.), vehicle characteristic(s) information, vehicle identification number ("VIN") information, battery compatibility information, or the like. The vehicle identification device 285 is adapted to communicate with the battery identification device 215 (or vice versa), as indicated by arrow 286. For example, the vehicle identification device 285 may be adapted to communicate with the battery identification device 215 (or vice versa) via near field communication (NFC), radio-frequency identification (RFID), Bluetooth, infrared, proximity inference via, for example, global positioning system 220 (GPS) or triangulation, other indirect technologies, and/or any combination thereof. In some embodiments, in addition to, or instead of, the vehicle identification device 285 communicating with the battery identification device 215 (or vice versa), the vehicle identification device 285 and the battery identification device 215 each communicate with the vehicle control unit 110. In any case, the identifying information communicated between the vehicle identification device 285, the battery identification device 215, and/or the vehicle control unit 110 may be relayed to the central server 125 (e.g., via the communication module 120, the charging station 145, and/or the network 130) to link the vehicle battery 190 with the vehicle 105 so that the battery usage tracking system 100 can recognize and record if and when the vehicle battery 190 is exchanged for another vehicle battery or is placed in another vehicle (other than the vehicle 105).

In some embodiments, the vehicle identification device 285 may be or include an active device and the battery identification device 215 may be or include a passive device so that the vehicle identification device 285 provides power (i.e., wirelessly) to the battery identification device 215 to read or "interrogate" the identifying data stored on the battery identification device 215. In addition, or instead, the battery identification device 215 may be or include an active device and the vehicle identification device 285 may be or include a passive device so that the battery identification device 215 provides power (i.e., wirelessly) to the vehicle identification device 285 to read or "interrogate" the identifying data stored on the vehicle identification device 285.

In some embodiments, as in FIG. 2, the interface engine 155, which is operably coupled to, and adapted to be in communication with, the vehicle control unit 110, includes at least one input and output device or system that enables a user to interact with the vehicle control unit 110 and the functions that the vehicle control unit 110 provides. For example, the interface engine 155 may include a display unit 290 and an input/output ("I/O") device 295. The display unit 290 may be, include, or be part of multiple display units. For example, in some embodiments, the display unit 290 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105; accordingly, as used herein the reference numeral 290 may refer to one, or any combination, of the display units. The I/O device 295 may be, include, or be part of a communication port (e.g., a USB port), a Bluetooth communication interface, a tough-screen display unit, soft keys associated with a dash, a steering wheel, or another component of the vehicle 105, and/or similar components. Other examples of sub-components that may be part of the interface engine 155 include, but are not limited to, audible alarms, visual alerts, telecommunications equipment, and computer-related components, peripherals, and systems.

In some embodiments, a portable user device 300 belonging to an occupant of the vehicle 105 may be coupled to, and adapted to be in communication with, the interface engine 155. For example, the portable user device 300 may be coupled to, and adapted to be in communication with, the interface engine 155 via the I/O device 295 (e.g., the USB port and/or the Bluetooth communication interface). In an embodiment, the portable user device 300 is a handheld or otherwise portable device which is carried onto the vehicle 105 by a user who is a driver or a passenger on the vehicle 105. In addition, or instead, the portable user device 300 may be removably connectable to the vehicle 105, such as by temporarily attaching the portable user device 300 to the dash, a center console, a seatback, or another surface in the vehicle 105. In another embodiment, the portable user device 300 may be permanently installed in the vehicle 105. In some embodiments, the portable user device 300 is, includes, or is part of one or more computing devices such as personal computers, personal digital assistants, cellular devices, mobile telephones, wireless devices, handheld devices, laptops, audio devices, tablet computers, game consoles, cameras, and/or any other suitable devices. In several embodiments, the portable user device 300 is a smartphone such as, for example, an iPhone® by Apple Incorporated.

In some embodiments, as in FIG. 2, the charging station 145 includes a power supply 305, a transmitter 310, a receiver 315, a processor 320, and a memory 325. In some embodiments, one or the other of the transmitter 310 and the receiver 315 may be omitted according to the particular application for which the charging station 145 is to be used. In some embodiments, the transmitter 310 and the receiver 315 are combined into a transceiver capable of both sending and receiving wireless signals. In any case, the transmitter 310 and the receiver 315 are adapted to send/receive data to/from the central server 125, as indicated by arrow 326. The charging station 145 is adapted to recharge the vehicle battery 190, as indicated by arrow 328. In some embodiments, as in FIG. 2, before, during, and/or after the recharging of the battery by the charging station 145, the charging station 145 is further adapted to send/receive data to/from the vehicle control unit 110, as indicated by arrow 330.

Figure 3:
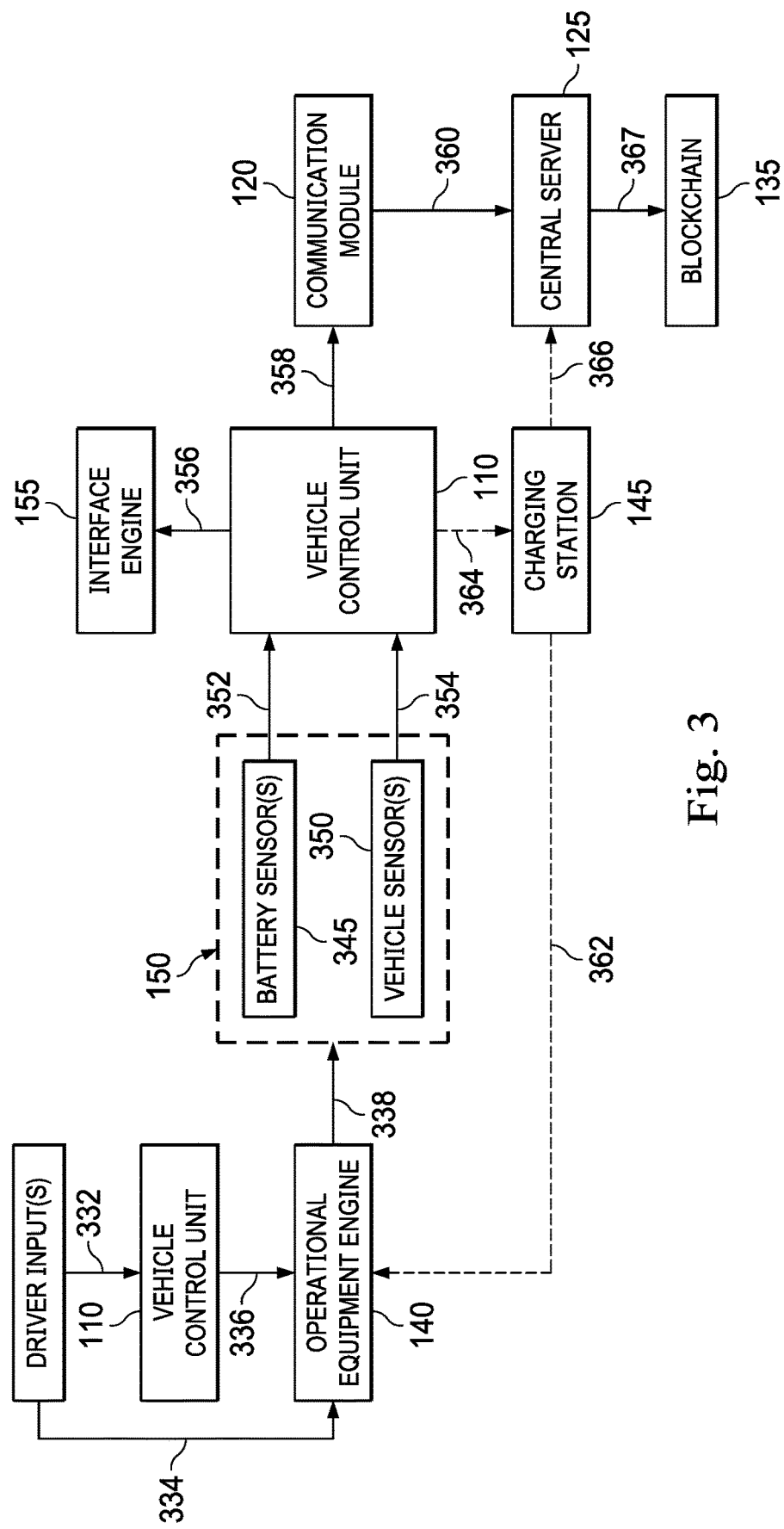
FIG. 3 is a diagrammatic view of the battery usage tracking system of FIG. 1 and/or the apparatus of FIG. 2 in operation, according to one or more embodiments of the present disclosure.

Referring to FIG. 3, with continuing reference to FIGS. 1 and 2, in operation, the vehicle control unit 110 and the operational equipment engine 140 receive driver input(s) to control driving operation(s) of the vehicle 105 (e.g., accelerating, braking, steering, etc.), as indicated by arrows 332 and 334, respectively. In addition, or instead, the operational equipment engine 140 may receive control signals from the vehicle control unit 110 to control the driving operation(s) of the vehicle 105, as indicated by arrow 336. For example, the motor 195, the drivetrain 200, the steering system 205, and/or the braking system 210 may receive the driver input(s) and/or the control signals from the vehicle control unit 110 to control the driving operation(s) of the vehicle 105. In response to receiving the driver input(s) and/or the control signals from the vehicle control unit 110, the operational equipment engine 140 executes the driving operation(s) of the vehicle 105. The sensor engine 150 measures or senses various operating parameters related to the driving operation(s) of the vehicle 105 executed by the operational equipment engine 140, as indicated by arrow 338. In this regard, in some embodiments, as in FIG. 3, the sensor engine 150 includes battery sensor(s) 345 associated with the vehicle battery 190 and vehicle sensor(s) 350 associated with the vehicle 105.

During the operational equipment engine 140's execution of the driving operation(s), the battery sensor(s) 345 detect and monitor various operating parameters associated with the vehicle battery 190. For example, in some embodiments, the battery sensor(s) 345 may be or include the humidity sensor 225, the temperature sensor 230, the barometric pressure sensor 235, the magnetic sensor 240, and/or the shock/vibration sensor 245. Moreover, during the operational equipment engine 140's execution of the driving operation(s), the vehicle sensor(s) 350 detect and monitor various operating parameters associated with the vehicle 105. For example, in some embodiments, the vehicle sensor(s) 350 may be or include the global positioning system 220, the vehicle impact sensor(s) 250, the airbag sensor 255, the braking sensor 260, the accelerometer 265, the speedometer 270, and/or the tachometer 275. The measured operating parameters associated with the vehicle battery 190 and/or the vehicle 105 are then communicated (e.g., intermittently or continuously) to the vehicle control unit 110, as indicated by arrows 352 and 354, respectively.

The vehicle control unit 110 may aggregate one or more of the measured operating parameters (i.e., associated with the vehicle battery 190 and/or the vehicle 105) in the memory 170. In addition, or instead, the processor 165 of the vehicle control unit 110 may execute programming stored in the memory 170 to identify one or more battery-critical event(s) based on the data received from the sensor engine 150 (i.e., the battery sensor(s) 345 and/or the vehicle sensor(s) 350), and to aggregate operating parameters measured by the sensor engine 150 before, during, and/or after occurrence of the one or more battery-critical event(s) in the memory 170. The one or more battery-critical event(s) identified using the vehicle control unit 110 may include, but is/are not limited to: long term unfavorable and/or harmful conditions in or around the vehicle battery 190 (e.g., insufficient or excess moisture, heat, cold, barometric pressure, shock, vibration, magnetic field, etc.) (as measured by the humidity sensor 225, the temperature sensor 230, the barometric pressure sensor 235, the magnetic sensor 240, the shock/vibration sensor 245, the battery load sensor 280, another sensor or system, or any combination thereof); charging, discharging, and/or overcharging events/patterns of the vehicle battery 190 (e.g., exposure to extreme heat when overcharged, wet conditions when charging, etc.) (as detected by the battery load sensor 280, the humidity sensor 225, the temperature sensor 230, the barometric pressure sensor 235, the magnetic sensor 240, the shock/vibration sensor 245, another sensor or system, or any combination thereof); local weather events/patterns (e.g., environmental precipitation, humidity, barometric pressure, etc.) (as detected by the humidity sensor 225, the temperature sensor 230, the barometric pressure sensor 235, other sensors/systems external to the vehicle 105 such as, for example, local, regional, or national weather services, another sensor or system, or any combination thereof) correlated with the location of the vehicle 105 (e.g., as tracked by the global positioning system); and driving events/patterns of the vehicle 105 (e.g., accidents, driving habits, road conditions, etc.) (as detected by the shock/vibration sensor 245, the vehicle impact sensor(s) 250, the airbag sensor 255, the braking sensor 260, the accelerometer 265, the speedometer 270, the tachometer 275, another sensor or system, or any combination thereof).

During the operational equipment engine 140's execution of the driving operation, the vehicle control unit 110 communicates (e.g., continuously) one or more of the measured operating parameters to the interface engine 155 for display to the driver of the vehicle 105, as indicated by arrow 356. For example, the speed of the vehicle 105 as measured by the speedometer 270 may be displayed to the driver of the vehicle 105 via the display unit 290. Furthermore, the communication module 120 relays (e.g., via the network 130) (either continuously or intermittently, depending on connectivity with the network 130) the operating parameters aggregated in the memory 170 to the central server 125, as indicated by arrows 358 and 360. In addition to, or instead of, the vehicle control unit 110 identifying the battery-critical event(s) before, during, or after which to aggregate data measured by the sensor engine 150 in the memory 170, the central server 125 itself may identify the battery-critical event(s) based on data received from the communication module 120, and aggregate operating parameters measured by the sensor engine 150 (and communicated to the central server 125 by the communication module 120) before, during, and/or after occurrence of the one or more battery-critical event(s).

The charging station 145 is operably coupleable to the operational equipment engine 140 of the vehicle 105 to recharge the vehicle battery 190 with electrical power, as indicated by arrow 362. More particularly, during the recharging of the vehicle 105 by the charging station 145, power flows from the power supply 305 of the charging station 145 to the vehicle battery 190 of the vehicle 105. Moreover, in some embodiments, as in FIG. 3, during the recharging of the vehicle 105 by the charging station 145, the charging station 145 relays (e.g., via the network 130) (either continuously or intermittently, depending on connectivity with the network 130) the operating parameters aggregated in the memory 170 from the vehicle control unit 110 to the central server 125, as indicated by arrows 364 and 366. In addition to, or instead of, the vehicle control unit 110 identifying the battery-critical event(s) before, during, or after which to aggregate data measured by the sensor engine 150 in the memory 170, the charging station 145 itself may identify (e.g., using programming executed by the processor 320) the battery-critical event(s) based on data received from the vehicle control unit 110, and aggregate operating parameters measured by the sensor engine 150 before, during, and/or after occurrence of the one or more battery-critical event(s) in the memory 325. In such embodiments, the charging station 145 then communicates the operating parameters aggregated in the memory 325 to the central server 125. Finally, the central server 125 communicates the aggregated data received from the communication module 120 and the charging station 145 to the blockchain 135, as indicated by arrow 367.

Figure 4:
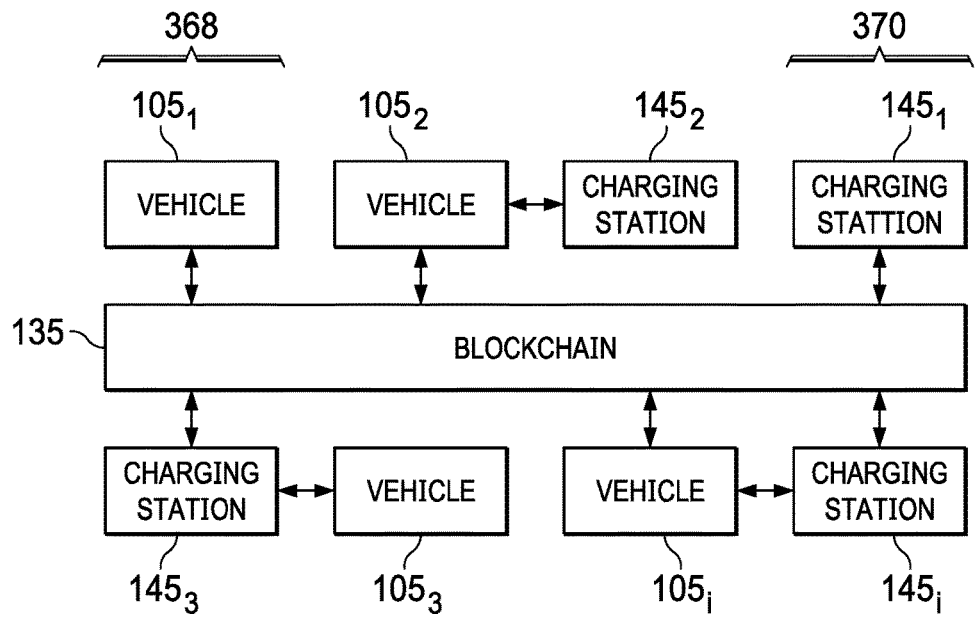
FIG. 4 is a diagrammatic view of a battery usage tracking system operably to track the battery usage of a fleet of vehicles, according to one or more embodiments of the present disclosure.

Referring to FIG. 4, with continuing reference to FIGS. 1-3, in an embodiment, multiple vehicles $105_{1-i}$ (which are substantially identical to the vehicle 105) and/or multiple charging stations $145_{1-i}$ (which are substantially identical to the charging station 145) may be part of or include the battery usage tracking system 100. As a result, one or more operating parameters measured by sensor engines (which are substantially identical to the sensor engine 150) of the respective vehicles $105_{1-i}$ may be communicated to the central server 125 and stored in the blockchain 135. In this manner, the blockchain 135 may be used to track battery usage for an entire fleet of the vehicles $105_{1-i}$. For example, as indicated by reference numeral 368 in FIG. 4, the blockchain 135 may aggregate data detected by the sensor engine of the vehicle $105_1$ and communicated to the central server 125 (e.g., via the network 130) using a communication module (which is substantially identical to the communication module 120) of the vehicle $105_1$, the data being associated with battery-critical events having been identified using programming executed by the vehicle control unit (which is substantially identical to the vehicle control unit 110) of the vehicle $105_1$. For another example, as indicated by reference numeral 370 in FIG. 4, the blockchain 135 may aggregate data detected by the sensor engine of the vehicle $105_2$ and communicated to the central server 125 (e.g., via the network 130) using the charging station $145_1$, the data being associated with battery-critical events having been identified using programming executed by the charging station $145_1$ and/or the vehicle control unit (which is substantially identical to the vehicle control unit 110) of the vehicle $105_1$. Still other examples in which the blockchain 135 aggregates data communicated to the central server 125 from the vehicle $105_2$, the charging station $145_3$, the vehicle $105_i$, and the charging station $145_i$ are also shown in FIG. 4.

Figure 5:
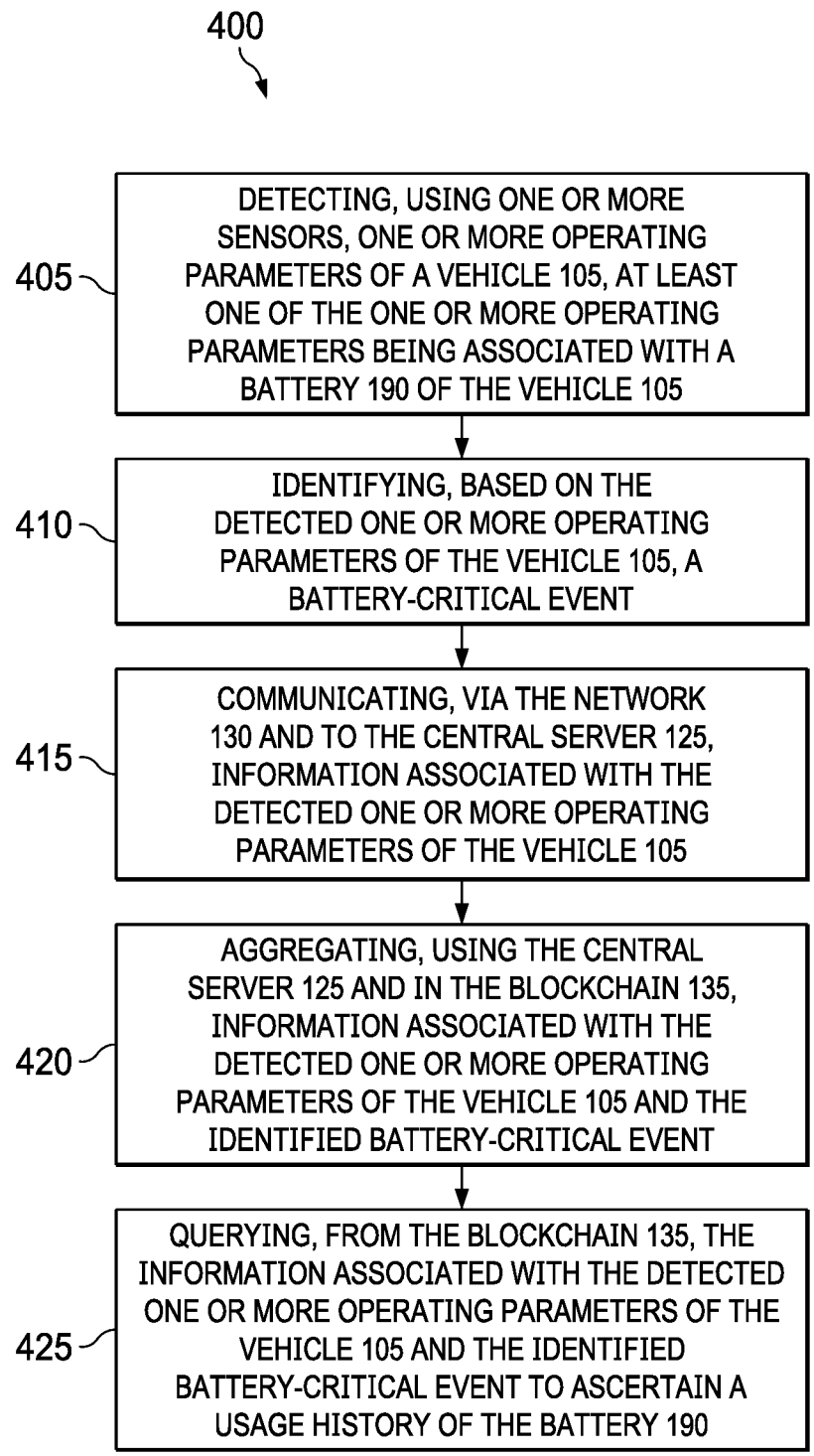
FIG. 5 is a flow diagram of a method for implementing one or more embodiments of the present disclosure.

Referring to FIG. 5, in an embodiment, a method of operating the battery usage tracking system 100 is generally referred to by the reference numeral 400. The method 400 is carried out in response to receiving data readings from the global positioning system 220, the humidity sensor 225, the temperature sensor 230, the barometric pressure sensor 235, the magnetic sensor 240, the shock/vibration sensor 245, the vehicle impact sensor(s) 250, the airbag sensor 255, the braking sensor 260, the accelerometer 265, the speedometer 270, the tachometer 275, the battery load sensor 280, the vehicle identification device 285, the battery identification device 215, or any combination thereof. The method 400 includes, at a step 405, detecting, using one or more sensors, one or more operating parameters of a vehicle 105, at least one of the one or more operating parameters being associated with a battery 190 of the vehicle 105. At a step 410, a battery-critical event is identified based on the detected one or more operating parameters of the vehicle 105. In some embodiments, the battery-critical event is identified using the vehicle control unit 110 of the vehicle 105; and the method further includes communicating, via the network 130 and to the central server 125, information associated with the identified battery-critical event. For example, the information associated with the identified battery-critical event may be communicated, via the network 130 and to the central server 125, using the communication module 120 of the vehicle 105. In other embodiments, the battery-critical event is identified using the central server 125. In still other embodiments, the battery-critical event is identified using the charging station 145. In some embodiments, the method 400 further includes communicating, via the network 130 and to the central server 125, information associated with the identified battery-critical event.

At a step 415, information associated with the detected one or more operating parameters of the vehicle 105 is communicated via the network 130 and to the central server 125. In some embodiments, the information associated with the detected one or more operating parameters of the vehicle 105 is communicated, via the network 130 and to the central server 125, using the communication module 120 of the vehicle 105. In some embodiments, the method further includes recharging, using the charging station 145, the battery 190 of the vehicle 105; and the information associated with the detected one or more operating parameters of the vehicle 105 is communicated, via the network 130 and to the central server 125, using the charging station 145. At a step 420, information associated with the detected one or more operating parameters of the vehicle 105 and the identified battery-critical event is aggregated using the central server 125 and in the blockchain 135. Finally, at a step 425, the information associated with the detected one or more operating parameters of the vehicle 105 and the identified battery-critical event is queried from the blockchain 135 to ascertain a usage history of the battery 190.

In some embodiments, the operation of the system 100 and/or the execution of the method 400 provides a finer understanding of the vehicle battery 190's usage history. In some embodiments, the operation of the system 100 and/or the execution of the method 400 makes it easier to track the usage history of the vehicle battery 190 over time, even if the original vehicle in which the vehicle battery 190 was installed has worn out or been otherwise decommissioned and the vehicle battery 190 has been be recycled to power another vehicle. In some embodiments, the operation of the system 100 and/or the execution of the method 400 provides a more detailed (and immutable) accounting of the vehicle battery 190's usage to better assess a residual value of the vehicle battery 190.

Figure 6:
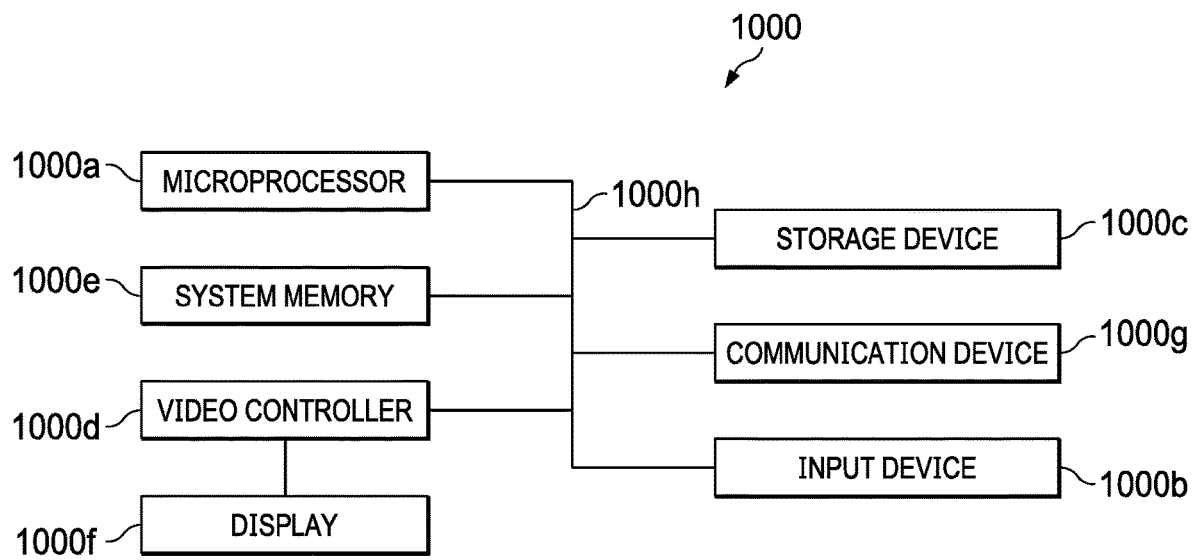
FIG. 6 is a diagrammatic illustration of a computing node for implementing one or more embodiments of the present disclosure.

Referring to FIG. 6, in an embodiment, a computing node 1000 for implementing one or more embodiments of one or more of the above-described elements, control units (e.g., 110), apparatus (e.g., 160), systems (e.g., 100), methods (e.g., 400) and/or steps (e.g., 405, 410, 415, 420, and/or 425), or any combination thereof, is depicted. The node 1000 includes a microprocessor 1000a, an input device 1000b, a storage device 1000c, a video controller 1000d, a system memory 1000e, a display 1000f, and a communication device 1000g all interconnected by one or more buses 1000h. In several embodiments, the storage device 1000c may include a floppy drive, hard drive, CD-ROM, optical drive, any other form of storage device or any combination thereof. In several embodiments, the storage device 1000c may include, and/or be capable of receiving, a floppy disk, CD-ROM, DVD-ROM, or any other form of computer-readable medium that may contain executable instructions. In several embodiments, the communication device 1000g may include a modem, network card, or any other device to enable the node 1000 to communicate with other nodes. In several embodiments, any node represents a plurality of interconnected (whether by intranet or Internet) computer systems, including without limitation, personal computers, mainframes, PDAs, smartphones and cell phones.

In several embodiments, one or more of the components of any of the above-described systems include at least the node 1000 and/or components thereof, and/or one or more nodes that are substantially similar to the node 1000 and/or components thereof. In several embodiments, one or more of the above-described components of the node 1000 and/or the above-described systems include respective pluralities of same components.

In several embodiments, a computer system typically includes at least hardware capable of executing machine readable instructions, as well as the software for executing acts (typically machine-readable instructions) that produce a desired result. In several embodiments, a computer system may include hybrids of hardware and software, as well as computer sub-systems.

In several embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several embodiments, hardware may include any physical device that is capable of storing machine-readable instructions, such as memory or other data storage devices. In several embodiments, other forms of hardware include hardware sub-systems, including transfer devices such as modems, modem cards, ports, and port cards, for example.

In several embodiments, software includes any machine code stored in any memory medium, such as RAM or ROM, and machine code stored on other devices (such as floppy disks, flash memory, or a CD ROM, for example). In several embodiments, software may include source or object code. In several embodiments, software encompasses any set of instructions capable of being executed on a node such as, for example, on a client machine or server.

In several embodiments, combinations of software and hardware could also be used for providing enhanced functionality and performance for certain embodiments of the present disclosure. In an embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several embodiments, computer readable mediums include, for example, passive data storage, such as a random access memory (RAM) as well as semi-permanent data storage such as a compact disk read only memory (CD-ROM). One or more embodiments of the present disclosure may be embodied in the RAM of a computer to transform a standard computer into a new specific computing machine. In several embodiments, data structures are defined organizations of data that may enable an embodiment of the present disclosure. In an embodiment, a data structure may provide an organization of data, or an organization of executable code.

In several embodiments, any networks and/or one or more portions thereof, may be designed to work on any specific architecture. In an embodiment, one or more portions of any networks may be executed on a single computer, local area networks, client-server networks, wide area networks, internets, hand-held and other portable and wireless devices and networks.

In several embodiments, a database may be any standard or proprietary database software. In several embodiments, the database may have fields, records, data, and other database elements that may be associated through database specific software. In several embodiments, data may be mapped. In several embodiments, mapping is the process of associating one data entry with another data entry. In an embodiment, the data contained in the location of a character file can be mapped to a field in a second table. In several embodiments, the physical location of the database is not limiting, and the database may be distributed. In an embodiment, the database may exist remotely from the server, and run on a separate platform. In an embodiment, the database may be accessible across the Internet. In several embodiments, more than one database may be implemented.

In several embodiments, a plurality of instructions stored on a computer readable medium may be executed by one or more processors to cause the one or more processors to carry out or implement in whole or in part the above-described operation of each of the above-described elements, control units (e.g., 110), apparatus (e.g., 160), systems (e.g., 100), methods (e.g., 400) and/or steps (e.g., 405, 410, 415, 420, and/or 425), and/or any combination thereof. In several embodiments, such a processor may include one or more of the microprocessor 1000a, any processor(s) that are part of the components of the above-described systems, and/or any combination thereof, and such a computer readable medium may be distributed among one or more components of the above-described systems. In several embodiments, such a processor may execute the plurality of instructions in connection with a virtual computer system. In several embodiments, such a plurality of instructions may communicate directly with the one or more processors, and/or may interact with one or more operating systems, middleware, firmware, other applications, and/or any combination thereof, to cause the one or more processors to execute the instructions.

A method has been disclosed. The method generally includes detecting, using one or more sensors, one or more operating parameters of a vehicle, at least one of the one or more operating parameters being associated with a battery of the vehicle; identifying, based on the detected one or more operating parameters of the vehicle, a battery-critical event; communicating, via a network and to a central server, information associated with the detected one or more operating parameters of the vehicle; aggregating, using the central server and in a blockchain, information associated with the detected one or more operating parameters of the vehicle and the identified battery-critical event; and querying, from the blockchain, the information associated with the detected one or more operating parameters of the vehicle and the identified battery-critical event to ascertain a usage history of the battery.

The foregoing method embodiment may include one or more of the following elements, either alone or in combination with one another:
  The information associated with the detected one or more operating parameters of the vehicle is communicated, via the network and to the central server, using a communication module of the vehicle.
  The battery-critical event is identified using a control unit of the vehicle; and the method further includes communicating, via the network and to the central server, information associated with the identified battery-critical event.
  The information associated with the identified battery-critical event is communicated, via the network and to the central server, using a communication module of the vehicle.
  The battery-critical event is identified using the central server.
  The method further includes recharging, using a charging station, the battery of the vehicle; and the information associated with the detected one or more operating parameters of the vehicle is communicated, via the network and to the central server, using the charging station.
  The battery-critical event is identified using the charging station; and the method further includes communicating, via the network and to the central server, information associated with the identified battery-critical event.

A system has also been disclosed. The system generally includes a vehicle having a battery adapted to power the vehicle; one or more sensors adapted to detect one or more operating parameters of the vehicle, at least one of the one or more operating parameters being associated with the battery of the vehicle; a central server to which information associated with the detected one or more operating parameters of the vehicle is adapted to be communicated via a network; and a blockchain in which information associated with the detected one or more operating parameters of the vehicle and a battery-critical event is adapted to be aggregated using the central server, and from which the information associated with the detected one or more operating parameters of the vehicle and the identified battery-critical event is adapted to be queried to ascertain a usage history of the battery; wherein the battery-critical event is identified based on the detected one or more operating parameters of the vehicle.

The foregoing system embodiment may include one or more of the following elements, either alone or in combination with one another:
  The vehicle has a communication module adapted to communicate the information associated with the detected one or more operating parameters of the vehicle to the central server via the network.
  The vehicle has a control unit adapted to identify the battery-critical event.
  The vehicle has a communication module adapted to communicate information associated with the identified battery-critical event to the central server via the network.
  The central server is adapted to identify the battery-critical event.
  The system further includes a charging station adapted to recharge the battery of the vehicle; and the charging station is adapted to communicate the information associated with the detected one or more operating parameters of the vehicle to the central server via the network.

The charging station is adapted to identify the battery-critical event, and to communicate information associated with the identified battery-critical event to the central server via the network.

An apparatus has also been disclosed. The apparatus generally includes a non-transitory computer readable medium; and a plurality of instructions stored on the non-transitory computer readable medium and executable by one or more processors, the plurality of instructions including: instructions that, when executed, cause the one or more processors to detect, using one or more sensors, one or more operating parameters of a vehicle, at least one of the one or more operating parameters being associated with a battery of the vehicle; instructions that, when executed, cause the one or more processors to identify, based on the detected one or more operating parameters of the vehicle, a battery-critical event; instructions that, when executed, cause the one or more processors to communicate, via a network and to a central server, information associated with the detected one or more operating parameters of the vehicle; instructions that, when executed, cause the one or more processors to aggregate, using the central server and in a blockchain, information associated with the detected one or more operating parameters of the vehicle and the identified battery-critical event; and instructions that, when executed, cause the one or more processors to query, from the blockchain, the information associated with the detected one or more operating parameters of the vehicle and the identified battery-critical event to ascertain a usage history of the battery.

The foregoing apparatus embodiment may include one or more of the following elements, either alone or in combination with one another:

When the instructions that cause the one or more processors to communicate, via the network and to the central server, the information associated with the detected one or more operating parameters of the vehicle are executed, the information associated with the detected one or more operating parameters of the vehicle is communicated, via the network and to the central server, using a communication module of the vehicle.

When the instructions that cause the one or more processors to identify, based on the detected one or more operating parameters of the vehicle, the battery-critical event are executed, the battery-critical event is identified using a control unit of the vehicle; and the plurality of instructions further include instructions that, when executed, cause the one or more processors to communicate, via the network and to the central server, information associated with the identified battery-critical event.

When the instructions that cause the one or more processors to communicate, via the network and to the central server, the information associated with the identified battery-critical event are executed, the information associated with the identified battery-critical event is communicated, via the network and to the central server, using a communication module of the vehicle.

When the instructions that cause the one or more processors to communicate, via the network and to the central server, the information associated with the identified battery-critical event are executed, the battery-critical event is identified using the central server.

The plurality of instructions further include instructions that, when executed, cause the one or more processors to recharge, using a charging station, the battery of the vehicle; and, when the instructions that cause the one or more processors to communicate, via the network and to the central server, the information associated with the detected one or more operating parameters of the vehicle are executed, the information associated with the detected one or more operating parameters of the vehicle is communicated, via the network and to the central server, using the charging station.

When the instructions that cause the one or more processors to identify, based on the detected one or more operating parameters of the vehicle, the battery-critical event are executed, the battery-critical event is identified using the charging station; and the plurality of instructions further include instructions that, when executed, cause the one or more processors to communicate, via the network and to the central server, information associated with the identified battery-critical event.

It is understood that variations may be made in the foregoing without departing from the scope of the present disclosure.

In some embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In some embodiments, while different steps, processes, and procedures are described as appearing as distinct acts, one or more of the steps, one or more of the processes, and/or one or more of the procedures may also be performed in different orders, simultaneously and/or sequentially. In some embodiments, the steps, processes, and/or procedures may be merged into one or more steps, processes and/or procedures.

In some embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although some embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims.

What is claimed is:

1. A method, comprising:
   determining that a critical combination of events that may lead to a degradation of battery life in a battery of a vehicle has occurred,
   wherein determining that the critical combination of events has occurred comprises:
   detecting, using an environmental condition sensor of the vehicle, an environmental condition in, around, or otherwise associated with a battery of the vehicle;
   detecting, using a battery load sensor of the vehicle, a charging event experienced by the battery of the vehicle; and
   determining that the detected environmental condition met a critical threshold during the detected charging event;
   communicating, via a network and to a central server, information associated with the detected environmental condition and the detected charging event;
   aggregating, using the central server and in a blockchain, information associated with the determination that the critical combination of events has occurred, including at least the critical threshold met by the detected environmental condition during the detected charging event; and
   querying, from the blockchain, the information associated with the determination that the critical combination of events has occurred to ascertain a usage history of the battery.

2. The method of claim 1, wherein the information associated with the detected environmental condition and the detected charging event is communicated, via the network and to the central server, using a communication module of the vehicle.

3. The method of claim 1, wherein a control unit of the vehicle determines that the detected environmental condition met the critical threshold during the detected charging event; and
   wherein the method further comprises communicating, via the network and to the central server, the information associated with the determination that the critical combination of events has occurred, including at least the critical threshold met by the detected environmental condition during the detected charging event.

4. The method of claim 3, wherein the information associated with the determination that the critical combination of events has occurred is communicated, via the network and to the central server, using a communication module of the vehicle.

5. The method of claim 1, wherein the central server determines that the detected environmental condition met the critical threshold during the detected charging event.

6. The method of claim 1, further comprising recharging, using a charging station, the battery of the vehicle; and
   wherein the information associated with the detected environmental condition and the detected charging event is communicated, via the network and to the central server, using the charging station.

7. The method of claim 6, wherein the charging station determines that the detected environmental condition met the critical threshold during the detected charging event; and
   wherein the method further comprises communicating, via the network and to the central server, the information associated with the determination that the critical combination of events has occurred, including at least the critical threshold met by the detected environmental condition during the detected charging event.

8. The method of claim 1,
   wherein the environmental condition sensor comprises:
   a humidity sensor;
   a temperature sensor;
   a barometric pressure sensor;
   a magnetic sensor; or
   a shock and/or vibration sensor;
   and
   wherein the environmental condition in, around, or otherwise associated with the battery of the vehicle comprises:
   a humidity level;
   a temperature level;
   a barometric pressure level;
   a magnetic field; or
   a shock and/or vibration level.

9. A system, comprising:
   a vehicle having a battery adapted to power the vehicle;
   an environmental condition sensors adapted to detect an environmental condition in, around, or otherwise associated with the battery of the vehicle;
   a battery load sensor adapted to detect a charging event experienced by the battery of the vehicle;
   one or more processors adapted to determine that a critical combination of events that may lead to a degradation of battery life in a battery of a vehicle has occurred,
   wherein, to determine that the critical combination of events has occurred, the one or more processors is/are adapted to determine that the detected environmental condition met a critical threshold during the detected charging event;
   a central server to which information associated with the detected environmental condition and the detected charging event is adapted to be communicated via a network; and
   a blockchain in which information associated with the determination that the critical combination of events has occurred, including at least the critical threshold met by the detected environmental condition during the detected charging event, is adapted to be aggregated using the central server, and from which the information associated with the determination that the critical combination of events has occurred is adapted to be queried to ascertain a usage history of the battery.

10. The system of claim 9, wherein the vehicle has a communication module adapted to communicate the information associated with the detected environmental condition and the detected charging event to the central server via the network.

11. The system of claim 9, wherein the one or more processors is/are or include a control unit of the vehicle adapted to determine that the detected environmental condition met a critical threshold during the detected charging event.

12. The system of claim 11, wherein the vehicle has a communication module adapted to communicate information associated with the determination that the critical combination of events has occurred, including at least the critical threshold met by the detected environmental condition during the detected charging event, to the central server via the network.

13. The system of claim 9, wherein the one or more processors is/are or include the central server, which is adapted to determine that the detected environmental condition met the critical threshold during the detected charging event.

14. The system of claim 9, further comprising a charging station adapted to recharge the battery of the vehicle; and
wherein the charging station is adapted to communicate the information associated with the detected environmental condition and the detected charging event to the central server via the network.

15. The system of claim 14, wherein the one or more processors is/are or include the charging station, which is adapted to determine that the detected environmental condition met the critical threshold during the detected charging event, and to communicate information associated with the determination that the critical combination of events has occurred, including at least the critical threshold met by the detected environmental condition during the detected charging event, to the central server via the network.

16. The system of claim 9,
wherein the environmental condition sensor comprises:
   a humidity sensor;
   a temperature sensor;
   a barometric pressure sensor;
   a magnetic sensor; or
   a shock and/or vibration sensor;
and
wherein the environmental condition in, around, or otherwise associated with the battery of the vehicle comprises:
   a humidity level;
   a temperature level;
   a barometric pressure level;
   a magnetic field; or
   a shock and/or vibration level.

17. An apparatus, comprising:
a non-transitory computer readable medium; and
a plurality of instructions stored on the non-transitory computer readable medium and executable by one or more processors, wherein, when the instructions are executed by the one or more processors, the following step are executed:
   determining that a critical combination of events that may lead to a degradation of battery life in a battery of a vehicle has occurred,
      wherein determining that the critical combination of events has occurred comprises:
         detecting, using an environmental condition sensor of the vehicle, an environmental condition in, around, or otherwise associated with a battery of the vehicle;
         detecting, using a battery load sensor of the vehicle, a charging event experienced by the battery of the vehicle; and
         determining that the detected environmental condition met a critical threshold during the detected charging event;
   communicating, via a network and to a central server, information associated with the detected environmental condition and the detected charging event;
   aggregating, using the central server and in a blockchain, information associated with the determination that the critical combination of events has occurred, including at least the critical threshold met by the detected environmental condition during the detected charging event; and querying, from the blockchain, the information associated with the determination that the critical combination of events has occurred to ascertain a usage history of the battery.

18. The apparatus of claim 17, wherein the information associated with the detected environmental condition and the detected charging event is communicated, via the network and to the central server, using a communication module of the vehicle.

19. The apparatus of claim 17, wherein a control unit of the vehicle determines that the detected environmental condition met the critical threshold during the detected charging event; and
wherein when the instructions are executed by the one or more processors, the following steps are also executed:
   communicating, via the network and to the central server, the information associated with the determination that the critical combination of events has occurred, including at least the critical threshold met by the detected environmental condition during the detected charging event.

20. The apparatus of claim 19, wherein the information associated with the determination that the critical combination of events has occurred is communicated, via the network and to the central server, using a communication module of the vehicle.

21. The apparatus of claim 17, wherein the central server determines that the detected environmental condition met the critical threshold during the detected charging event.

22. The apparatus of claim 17,
wherein, when the instructions are executed by the one or more processors, the following steps are also executed:
   recharging, using a charging station, the battery of the vehicle;
and
wherein the information associated with the detected environmental condition and the detected charging event is communicated, via the network and to the central server, using the charging station.

23. The apparatus of claim 22,
wherein the charging station determines that the detected environmental condition met the critical threshold during the detected charging event; and
wherein, when the instructions are executed by the one or more processors, the following steps are also executed:
   communicating, via the network and to the central server, the information associated with the determination that the critical combination of events has occurred, including at least the critical threshold met by the detected environmental condition during the detected charging event.

24. The apparatus of claim 17,
wherein the environmental condition sensor comprises:
   a humidity sensor;
   a temperature sensor;
   a barometric pressure sensor;
   a magnetic sensor; or
   a shock and/or vibration sensor;
and
wherein the environmental condition in, around, or otherwise associated with the battery of the vehicle comprises:
   a humidity level;
   a temperature level;
   a barometric pressure level;
   a magnetic field; or
   a shock and/or vibration level.

\* \* \* \* \*